(12) United States Patent
Howley

(10) Patent No.: US 7,839,296 B2
(45) Date of Patent: Nov. 23, 2010

(54) SCALE AND READHEAD APPARATUS AND METHOD

(75) Inventor: Colin Keith Howley, Stonehouse (GB)

(73) Assignee: Renishaw PLC, Wotton-under-Edge (GB)

( * ) Notice: Subject to any disclaimer, the term of this patent is extended or adjusted under 35 U.S.C. 154(b) by 292 days.

(21) Appl. No.: 12/083,548

(22) PCT Filed: Nov. 13, 2006

(86) PCT No.: PCT/GB2006/004211

§ 371 (c)(1),
(2), (4) Date: Apr. 14, 2008

(87) PCT Pub. No.: WO2007/057645

PCT Pub. Date: May 24, 2007

(65) Prior Publication Data

US 2009/0229340 A1 Sep. 17, 2009

(30) Foreign Application Priority Data

Nov. 16, 2005 (GB) .................................. 0523273.1

(51) Int. Cl.
*G08B 5/22* (2006.01)
(52) U.S. Cl. .............................. 340/815.45; 340/815.68; 340/815.86
(58) Field of Classification Search ............ 340/815.45, 340/815.78, 815.68, 815.83, 815.86; 356/616, 356/619, 496, 617, 614, 498–499
See application file for complete search history.

(56) References Cited

U.S. PATENT DOCUMENTS

| | | | | |
|---|---|---|---|---|
| 4,479,716 A | * | 10/1984 | Nelle | 356/619 |
| 4,519,140 A | * | 5/1985 | Schmitt | 33/706 |
| 5,007,177 A | * | 4/1991 | Rieder et al. | 33/706 |
| 5,010,655 A | * | 4/1991 | Rieder et al. | 33/706 |
| 5,883,298 A | | 3/1999 | Holzapfel et al. | |
| 6,097,490 A | * | 8/2000 | Holzapfel et al. | 356/614 |
| 6,907,372 B1 | | 6/2005 | Spanner | |
| 7,089,678 B2 | * | 8/2006 | Novak et al. | 33/706 |
| 7,141,780 B2 | * | 11/2006 | Homer et al. | 250/231.13 |

FOREIGN PATENT DOCUMENTS

| | | |
|---|---|---|
| EP | 0 514 081 A1 | 11/1992 |
| EP | 0 543 513 A1 | 5/1993 |
| EP | 1 099 936 A1 | 5/2001 |
| EP | 1 106 972 A1 | 6/2001 |
| WO | WO 94/25830 A1 | 11/1994 |
| WO | WO 02/065061 A1 | 8/2002 |

* cited by examiner

*Primary Examiner*—Daniel Previl
(74) *Attorney, Agent, or Firm*—Oliff & Berridge, PLC

(57) ABSTRACT

A scale reading apparatus includes a readhead that is moveable relative to a scale. The readhead includes an incremental channel from which a series of reference mark pulses are produced as the readhead is moved relative to the scale. A reference mark channel is also provided that produce a reference mark gating pulse when the readhead passes a predetermined (absolute) position mark on the scale. An alignment detection unit monitors during use, phase alignment of the reference mark gating pulse and reference mark pulses. The alignment detection unit is arranged to monitor the phase of the leading and trailing edges of said reference mark gating pulse relative to the phase of the reference mark pulses. The apparatus may be used in position encoders and the like.

13 Claims, 5 Drawing Sheets

SCALE AND READHEAD APPARATUS AND METHOD

The present invention relates to scale and readhead apparatus having an incremental channel and a reference mark channel. More particularly, the invention relates to scale and readhead apparatus having means for indicating degradation in alignment of the incremental and reference mark channels during use.

A known form of optical scale reading apparatus for measuring the relative displacement of two members comprises a scale on one member and a readhead on the other member. The scale comprises a series of scale marks, such as light and dark lines, that define a periodically repeating pattern. The readhead has means for illuminating the scale and a sensor responsive to the resultant light patterns from which a measure of relative displacement of the scale and readhead can be determined. A scale having its marks in a periodic pattern is known as an incremental scale and the sensor of the readhead is typically arranged to produce a pair of quadrature phase signals. Examples of such apparatus are described in EP514081 and EP543513.

It is also known for the scale to be provided with one or more reference marks which, when detected by the readhead, provide a reference mark signal that enables the absolute position of the readhead to be determined. In order for a reference mark signal to be useful, its position with respect to the incremental scale must be known. In other words, the reference mark signal that is produced by the reference mark channel must be properly aligned with the corresponding incremental signal. Although various calibration techniques exist to ensure alignment of the reference mark and incremental signals is initially obtained, such alignment can degrade over time or with use. Such degradation may occur, for example, due to drift of electronic components or changes in readhead alignment.

It is known to monitor the alignment of the reference mark and incremental signals during use by comparing the phase of the midpoint of the reference mark signal relative to the phase of the corresponding incremental signal. If the phase of the midpoint of the reference mark signal falls outside a predetermined range, a warning signal is produced that is communicated to the user by flashing a warning LED. Although such a technique is adequate in most cases, it does not always detect misalignment between the incremental and reference mark channels that could result in malfunction of the apparatus.

It is thus an object of the present invention to provide an improved scale and readhead apparatus. It is a further object of the invention to provide an improved method of readhead operation. It is a still further object of the invention to provide a scale reading apparatus and corresponding method that provides an improved indication of degradation of alignment between the incremental and reference mark channels.

According to a first aspect of the invention, scale reading apparatus comprises a readhead moveable relative to a scale, the readhead comprising an incremental channel from which a series of reference mark pulses are produced as the readhead is moved relative to the scale, a reference mark channel arranged to produce a reference mark gating pulse when the readhead passes a predetermined (absolute) position mark on the scale and alignment detection means for monitoring, during use, phase alignment of the reference mark gating pulse and reference mark pulses, characterised in that the alignment detection means is arranged to monitor the phase of the leading and trailing edges of said reference mark gating pulse relative to the phase of the reference mark pulses.

Scale reading apparatus of the present invention thus allows alignment of the incremental and reference mark channels to be determined using the relative position or phase of the leading and trailing edges of the reference mark gating pulse relative to the position or phase of the associated reference mark pulses. The use of such a pulse edge monitoring technique provides a more reliable indication of channel alignment than prior art apparatus in which the phase of the mid-point of the reference mark pulse is compared to the phase of the incremental channel; this is described in more detail below. Apparatus of the present invention thus gives the user a more reliable measure of any channel alignment degradation than was previously possible.

Advantageously, the alignment detection means is arranged to generate a first alignment warning signal if one, or both, of said leading and trailing edges fall within a first phase range. The first phase range may cover, or extend slightly beyond, the phase range encompassed by each reference mark pulse. For example, the reference mark pulses may occur within the phase range of 0° to 90°. In such a case, a suitable phase range would extend from less than 0° (e.g. −45°) to more than 90° (e.g. 135°). The first phase range may thus be selected to cover the phase range over which apparatus malfunction is probable, or inevitable, if an edge of the reference mark gating pulse falls therein.

Conveniently, the alignment detection means is also arranged to generate a second alignment warning signal if one, or both, of said leading and trailing edges fall outside the first phase range but are within a second phase range, said second phase range being wider than said first phase range. The second phase range is thus wider than the first phase range and is intended to provide an early indication that the channel alignment is degrading, but has not yet degraded sufficiently to cause malfunction of the apparatus. This allows the user to schedule apparatus recalibration rather than being faced with a need to perform an immediate calibration without warning. The second range may extend, for example, from 270° to 180°. The second alignment warning signal would then be produced when an edge of the reference mark gating pulse falls within the second phase range but outside the first phase range (i.e. if an edge has a phase between 135° to 180° or between 270° to 315°).

Although providing two (i.e. first and second) phase ranges is described in detail herein, it should be noted that any number of nested phase ranges could be provided. In other words, one or more additional alignment warning signals (e.g. third, fourth, fifth etc alignment warning signals) may also be conveniently provided, each subsequent phase range being wider than the previous phase ranges. In this manner a more finely graduated series of warning signals may be implemented; for example an alignment quality indication between 1 (not aligned) to 10 (well aligned) may be provided.

Preferably, the alignment detection means is arranged to generate a channel aligned signal if both edges of the reference mark gating pulse fall outside the widest (e.g. second or additional) phase range. In other words, the alignment detection means may produce a signal to indicate that the incremental channel is properly aligned with the incremental channel; i.e. to provide a signal indicating that the leading and trailing edges of the reference mark gating pulse fall outside the second (and first) phase ranges. This provides positive confirmation that channel alignment is acceptable.

Advantageously, the readhead may also be arranged to produce an output reference mark signal by using the (typically analogue) reference mark gating pulse to gate the series of (typically digital) reference mark pulses. In this manner, a digital output reference mark signal is provided that comprises a single digital pulse whenever the readhead passes over the absolute position marker. The output reference mark signal may be used to reset the incremental channel count.

The alignment detection means preferably comprises a visual indicator, such as a bi-coloured light emitting diode (LED). The provision of an LED allows the channel alignment status to be readily communication to the user of the apparatus. For example, the LED may be arranged to flash "green" if the reference mark channel is deemed to be well aligned with the incremental channel, "orange" if the alignment has degraded to such an extent that at least one edge of the reference mark gating pulse falls within the second phase range (indicating calibration will be required shortly) or "red" if the alignment has reduced such that at least one edge of the reference mark gating pulse falls within the first phase range (indicating immediate calibration is required).

The LED is preferably arranged to flash the appropriate colour whenever the readhead passes over the reference mark. Such an LED may also be arranged to provide difference information (e.g. information related to the strength of the incremental channel signals) when the readhead is passed along the incremental scale away from the vicinity of the reference mark pulse. A suitable technique for monitoring operation of the incremental channel is described in EP514081. In such a manner, the observation of a single LED as the readhead passes along the scale and over the reference mark allows the user to ascertain whether the apparatus is operating properly or whether calibration is required immediately or in the near future. Such an LED may be located on the readhead or interface as required.

Although an LED based indication provides a simple way to communicate the alignment condition of the scale reading apparatus to a user, a more quantitative measure of alignment may be provided if required. For example, a channel alignment quality value (e.g. a number ranging from 1 to 10) could produced. Alternative, the phase of the reference mark gating pulse edges could be displayed (e.g. via a computer interface).

The apparatus may be configured to implement the alignment detection means in a number of ways that would be apparent to a person skilled in the art. For example, the alignment detection means may advantageously comprise suitably configured logic such as a Field Programmable Gate Array (FPGA) or programmable logic device (PLD). The logic may be located in the readhead or in a separate interface remote to the readhead. Alternatively, a suitable processor (e.g. a personal computer or waveform analyser) may be used to perform the signal processing function.

As described in more detail below, the scale may comprise a series of incremental marks and one or more reference marks. These may be provided on separate scale tracks or as a combined (embedded) scale of the type described in EP1360461. Although only one reference mark is necessary, the scale may comprise a plurality of user selectable or distance coded reference marks. For example, in the case of apparatus mounted on a rotary encoder device, four user selectable reference marks may be provided at 90° intervals.

Advantageously, the readhead apparatus comprises at least one optical sensor. In such an apparatus, the readhead may comprise an optical incremental sensor that generates phase and quadrature phase (sine and cosine) signals as it is passed along the incremental scale. A digitisation or interpolation process can then be used to convert the quadrature phase signals into the series of reference mark pulses. The apparatus is typically arranged such that one reference mark pulse is provided per cycle of the sine wave. In addition, the quadrature phase signals are used to generate the incremental channel pulses (i.e. the pulses that are counted to provide the incremental position information) and multiple incremental channel pulses may be provided per cycle of the sine wave. In such a system, the phase of all signals is typically measured relative to the phase of the sine wave.

It is important to note that the scale and readhead apparatus of the present invention is not limited to optical arrangements; the invention is equally applicable to other types of apparatus such as, for example, magnetic, capacitance or inductance scale reading systems. Furthermore, the kind of reference mark used may differ from the kind of incremental mark; for example, optical incremental marks may be used in combination with magnet reference marks etc.

According to a further aspect of the invention, a readhead for scale reading apparatus is provided, the readhead comprising an incremental channel from which a series of reference mark pulses are produced as the readhead is moved relative to an associated scale, a reference mark channel arranged to generate a reference mark gating pulse when the readhead passes a predetermined (absolute) position marker on the associated scale and alignment detection means for monitoring, during movement of the readhead relative to the associated scale, alignment of the reference mark gating pulse and reference mark pulses, characterised in that the alignment detection means is arranged to monitor the phase of the leading and trailing edges of said reference mark gating pulse relative to the phase of the reference mark pulses. Scale reading apparatus may comprise such a readhead and an appropriate scale.

According to a further aspect of the invention, scale reading apparatus comprises a readhead moveable relative to a scale, an incremental channel from which a series of reference mark pulses are produced as the readhead is moved relative to the scale, a reference mark channel arranged to generate a reference mark gating pulse when the readhead passes a predetermined (absolute) position mark on the scale and alignment detection means for monitoring, during use, alignment of the reference mark gating pulse and reference mark pulses, characterised in that the alignment detection means is arranged to monitor whether the reference mark gating pulse brackets a single reference mark pulse. In other words, the alignment detection means is arranged to ensure the rising and falling edges of the reference mark gating pulse do not encroach into the phase range occupied by the reference mark pulses.

According to a further aspect of the invention, a method for determining the alignment of the incremental and reference mark channels in scale reading apparatus comprises the steps of (i) producing a series of reference mark pulses from the incremental channel as the readhead is moved relative to the scale and (ii) producing a reference mark gating pulse from the reference mark channel when the readhead passes a predetermined (absolute) position mark on the scale, characterised in that the method further comprises the step (iii) of monitoring (e.g. measuring) the phase of the leading and trailing edges of reference mark gating pulses produced by the reference mark channel relative to the phase of the reference mark pulses produced by the incremental channel.

A computer, microprocessor or microcontroller may be programmed, or a computer program may be provided, to implement the above described method. Alternatively, appropriate logic (such as an FPGA or PLD) may be configured to allow the above described method to be implemented. An application specific integrated circuit (ASIC) may also be used.

The invention will now be described, by way of example only, with reference to the accompanying drawings in which.

Figure 1:
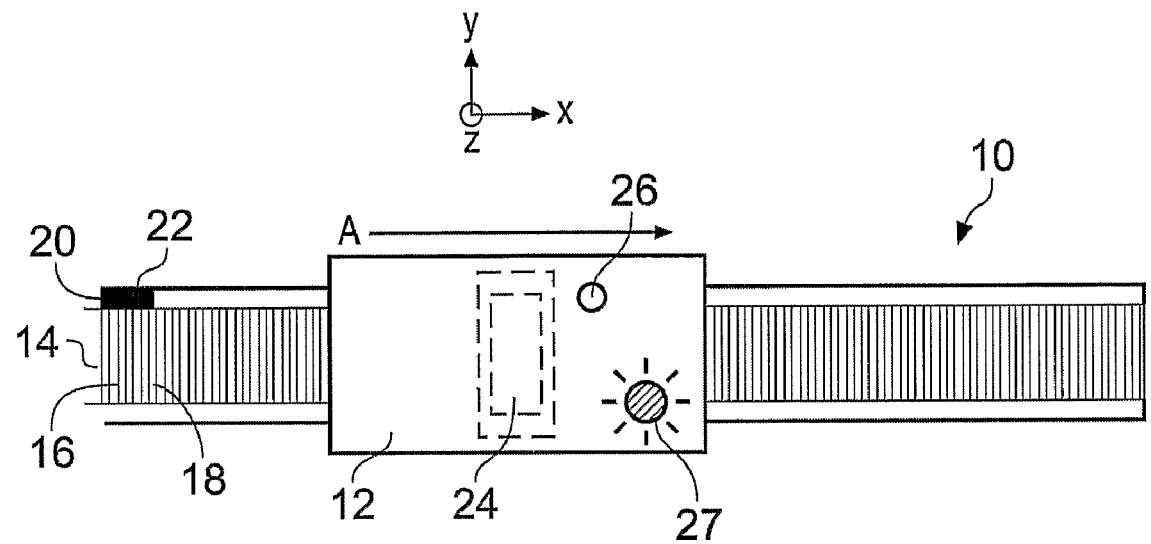
FIG. 1 is a plan view of a readhead and scale.

Referring to FIG. 1, scale reading apparatus is illustrated. The apparatus comprises a scale 10 and a readhead 12 that are moveable relative to one another.

The scale 10 comprises a first scale track 14 having a series of light 16 lines and dark lines 18 repeated along its length forming a so-called amplitude scale. The width of the lines depends on the required positional resolution and is typically of the order of 2-100 µm. An incremental optical sensor 24 of the readhead 12 detects the lines of the first scale track 14 as they pass the readhead and generates two sinusoidal output signals in quadrature phase (i.e. sine and cosine signals) as the readhead is moved along the scale. The provision of such quadrature phase signals allows both the amount of readhead movement and the direction of such movement to be determined. Incremental scale reading apparatus of this type is known and described in more detail elsewhere (e.g. see EP514081 and EP543513). Although an amplitude scale is described herein, a phase scale could alternatively be provided.

The scale 10 also includes a second scale track 20. The second scale track 20 includes a scale marking 22 which acts as an absolute position or reference mark indicator; the scale marking 22 indicated is typically an order of magnitude wider than the scale markings of the first scale track 14. The readhead 12 comprises a reference mark detector 26 to provide a reference mark gating signal or pulse when the readhead passes the reference mark thereby allowing the absolute position of the readhead relative to the scale to be determined. Although only a single reference mark 22 is shown in FIG. 1, the second scale track 20 could, if desired, comprise a number of user selectable or distance coded reference marks along its length. Furthermore, the parallel track arrangement shown (i.e. a first scale track 14 that is separate to the second scale track 20) could be replaced by a combined or embedded track arrangement of the type described in EP1360461.

The readhead may also comprise circuitry for monitoring its correct operation. A light emitting diode (LED) 27 may be provided on the readhead and/or any associated interface to provide the user with an indication that recalibration of the apparatus is required. For example, the readhead may be arranged to monitor the quadrature signals of the incremental optical sensor 24 as described in EP514081. As outlined in more detail below, a flash of the LED 27 as the readhead passes over the reference mark may also be used to indicate the quality of the alignment between the reference and incremental channels.

Figure 2:
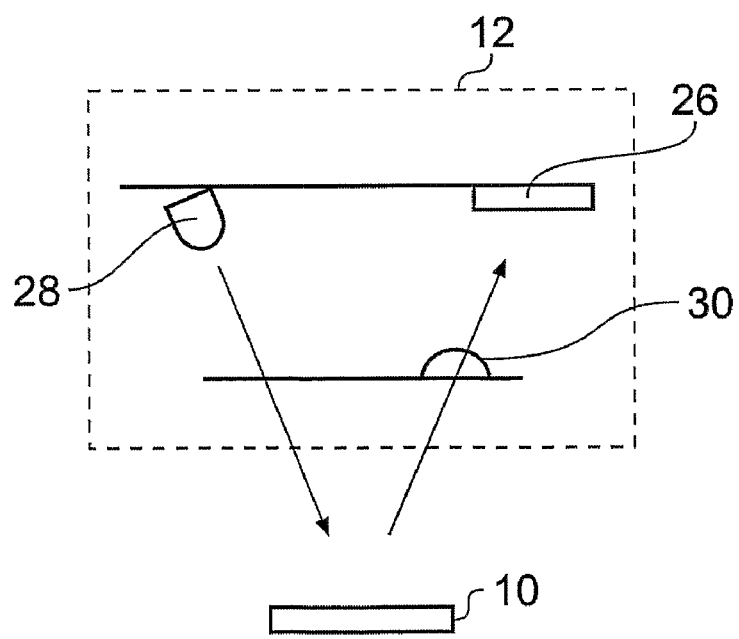
FIG. 2 is a view of the reference mark detector portion of the readhead shown in FIG. 1.
Figure 3:
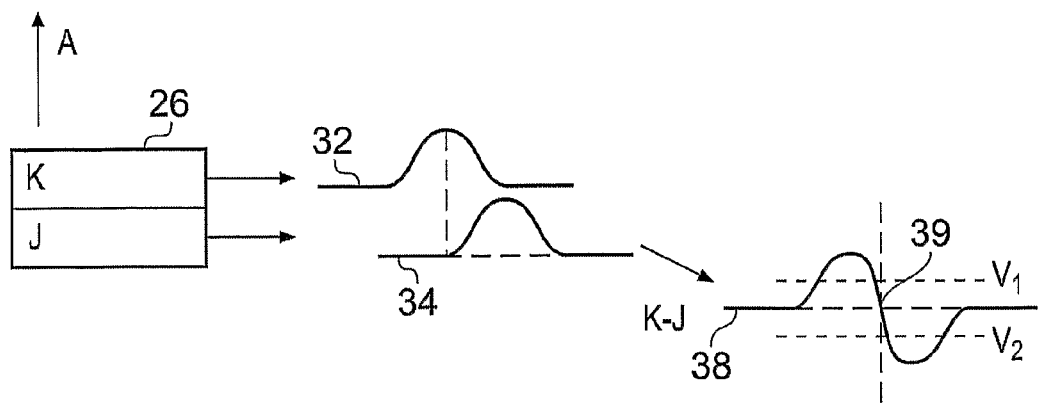
FIG. 3 shows the split detector of the reference mark detector illustrated in FIG. 2 and the typical signals produced during reference mark detection.

Referring now to FIGS. 2 and 3, a more detailed description of the generation of the reference mark signal in the apparatus of FIG. 1 is provided.

FIG. 2 illustrates an optical arrangement suitable for detecting reference marks such as scale marking 22. A light source 28 is provided in the readhead 12 to illuminate the scale 10. Light reflected by the scale 10 is focused by a lens 30 or other suitable optics onto a split detector 26. The reference mark may comprise a dark mark on a light background and the reference mark detector 26 will thus detect a reduction in light intensity as the readhead moves over the reference mark. Alternatively the reference mark may comprise a light mark over a dark background in which case the converse is true.

FIG. 3 illustrates the split detector 26 of the readhead and its associated electrical outputs. As the readhead moves in the direction shown by arrow A relative to the scale and hence to the reference mark, light will fall first on one half K of the split detector and then on the other half J. The outputs 32,34 of the two halves K,J of the split detector 26 are thus offset from one another. The difference of the two outputs is taken to form the difference signal 38 and the reference mark gating signal (which is described in more detail below) is derived by comparing the difference signal 38 with two voltage thresholds V1 and V2 near crossing point 39. These voltage thresholds are fixed and an analogue reference mark gating signal is thus output when the voltage of the difference signal 38 is between V1 and V2 in the vicinity of the zero crossing point 39.

Although a split detector is described above, the skilled person would appreciate that a number of alternative reference mark detectors could be used. For example, the reference mark could alternatively comprise an auto-correlator pattern to allow a more accurate measure of position to be obtained. It should also be noted that transmissive, rather than reflective, scale and readhead arrangements could be employed.

Scale reading apparatus of the type described with reference to FIGS. 1 to 3 above thus produces signals relating to both incremental movement and absolute position. In other words, the apparatus has an incremental channel providing information about relative movement of the readhead and scale (i.e. from the quadrature signals generated by the optical sensor 24) and a reference mark channel providing absolute position information using the reference mark (i.e. using the reference mark gating signal generated by the reference mark detector 26).

Referring to FIG. 4, the typical signals produced by scale reading apparatus of the type described with reference to FIGS. 1 to 3 are illustrated.

Figure 4A:
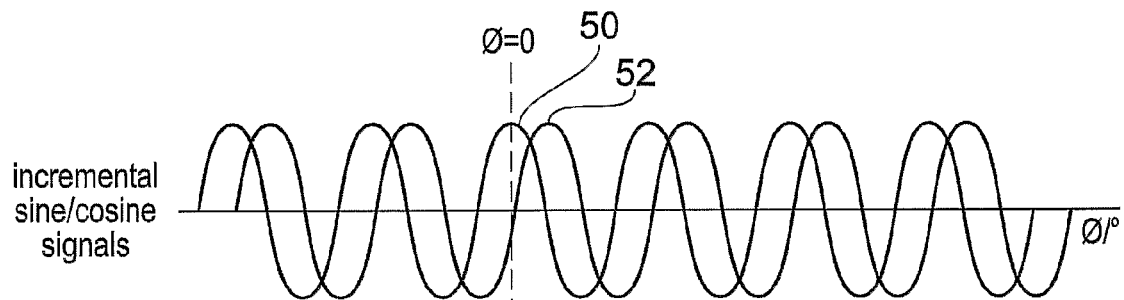
FIG. 4 illustrates the various signals produced as the readhead of the apparatus shown in FIG. 1 is passed along the scale.

FIG. 4a shows the quadrature phase (sine and cosine) signals 50 and 52 output by the incremental optical sensor 24 as the readhead 12 is passed along the scale 10. It should be noted that, hereinafter, the various signals of FIG. 4 will be described relative to the phase of the sinusoidal signal 50.

Figure 4B:
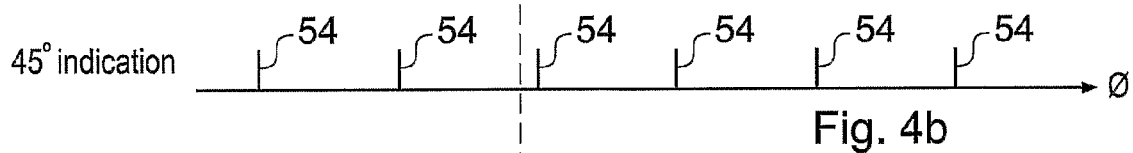
Figure 4C:
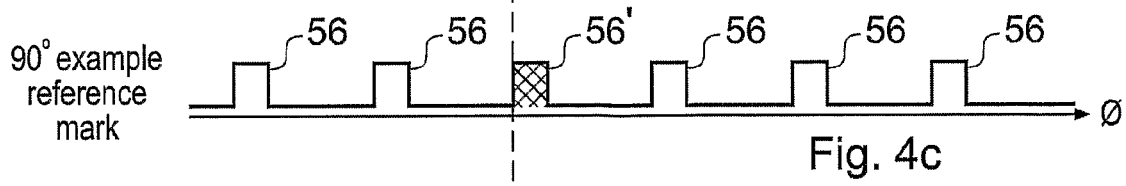

Analysis of the signals 50 and 52 allows a reference mark signal to be generated whenever the waveform 50 has a desired phase or falls within a predetermined phase range. FIG. 4b shows indication points 54 that indicate when the phase of the sinusoidal signal 50 is 45°; this can be readily detected by monitoring when the amplitude of the sinusoidal signal is positive and matches the amplitude of the cosine signals. In a typical device, an interpolation technique is used to generate a series of digital reference mark pulses from the quadrature phase signals 50 and 52; a train of such 90° wide reference mark pulses 56 centred on 45° are shown in FIG. 4*c*. It should be noted that the digital reference mark pulses 56 are typically generated solely for determining a reference mark position measurement; pulses 56 are thus distinct from the incremental channel pulses (not shown) that are counted to provide the required incremental measurement of readhead position. It should be noted that although 90° wide reference mark pulses are described in the present example, the reference mark pulses may be of any suitable width (e.g. they may be greater than 90° or less than 90° depending on the required device resolution).

Figure 4D:
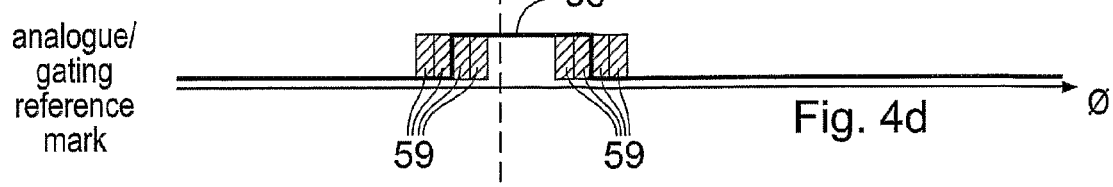

As mentioned above, the incremental channel of the apparatus is accompanied by a reference mark channel. As shown in FIG. 4*d*, the reference mark channel is arranged to produce a reference mark gating pulse 58 (also termed an analogue gating pulse) when the readhead passes over the reference mark of the second scale. The reference mark gating pulse 58 is used to indicate that the readhead is within a certain region on the scale. It should be noted that the reference mark gating pulse 58 does not itself provide any accurate positional information; it is used to identify a range over which a specific reference mark pulse 56 of the incremental channel is expected. This allows the specific reference mark pulse (e.g. pulse 56') that is associated with a fixed, absolute, position on the scale to be identified.

Although the reference mark gating pulse 58 is typically 360° wide, it may be narrower or wider as shown by the hatched regions 59 associated with reference mark gating pulse 58. The only requirement is that the reference mark gating pulse 58 straddles one, and only one, of the reference mark pulses 56 thereby allowing such a pulse to be uniquely identified.

Figure 4E:
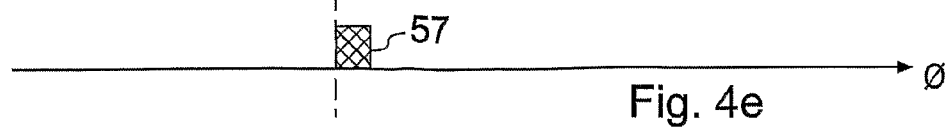

FIG. 4*e* shows the resultant (digital) absolute reference mark pulse 57 that is produced by gating the reference mark pulses (i.e. pulses 56 of FIG. 4*c*) using the reference mark gating pulse (i.e. pulse 58 of FIG. 4*d*). The resultant (digital) absolute reference mark pulse 57 thus provides absolute position information to the control apparatus whenever the readhead passes over the reference mark.

A number of techniques are known for initially aligning (i.e. calibrating) the phase of the reference mark gating pulse 58 and the reference mark pulses 56 produced by the incremental channel. One known calibration method is to geometrically adjust the readhead such that the incremental and reference mark channels are aligned with respect to each other. In another method of phasing the reference mark signal with respect to the incremental channel, the difference signal produced by the split detector (i.e. the difference signal 39 of FIG. 3) is adjusted electronically. In such a method the difference signal is moved up and down relative to the voltage thresholds $V_1$ and $V_2$ (or the voltage thresholds are adjusted) thereby redefining (or "phasing") the position of the lead and trailing edges of the reference mark gating pulse relative to the reference mark pulses. Our co-pending GB patent application 0522651.9 (agents' ref: 662) also describes a further, improved, calibration method for providing initial phase alignment of the reference mark and incremental channels.

Figure 5:
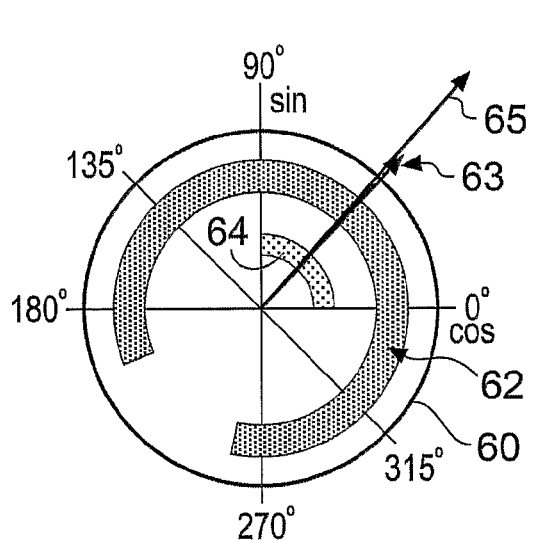
FIG. 5 is a Lissajous representation of the quadrature phase signals of the incremental channel with the reference mark gating pulse superimposed thereon for a well aligned device.

Referring now to FIG. 5, a Lissajous diagram is provided to illustrate the phase relationship between the incremental channel and reference mark channel for well aligned scale and readhead apparatus. In particular, FIG. 5 shows the incremental sine/cosine signal pair (e.g. signals 50 and 52 of FIG. 4) plotted against each other (cosine plotted horizontally, sine vertically) to form a Lissajous FIG. 60. In this example, the Lissajous FIG. 60 is a perfect circle because the amplitude of the sine and cosine signals is assumed to be identical and the phase difference between the signals is exactly 90°. In a real device, the skilled person would recognise that the Lissajous figure would be dependent on the properties of the quadrature phase signal and is unlikely to take the form of a perfect circle.

The first superimposed band 62 represents the reference mark gating pulse. In this example, the reference mark gating pulse is about 300° wide and has a leading edge at around 260° (which is equivalent to −100°) and a trailing edge at 200°. The second superimposed band 64 represents a 90° wide reference mark pulse centred on 45°(i.e. it is analogous to the pulses 56 described with reference to FIG. 4). In this example, the reference mark gating pulse brackets only a single reference mark pulse and the reference mark channel is thus well aligned with the incremental channel.

As mentioned above, it is known to monitor the alignment of the reference mark and incremental channels during use by determining the phase of the midpoint of the reference mark gating pulse relative to the phase of the reference mark pulses. Application of such a prior art technique to the present example provides a reference mark pulse midpoint of 45° (as indicated by arrow 63) and a reference mark gating pulse midpoint of 45° (as indicated by arrow 65). It can thus be seen that such a technique would (correctly) indicate good alignment of the incremental and reference mark channels.

It should be noted that the outcome of the analysis of the alignment of the incremental and reference mark channels may be communicated to the user by an LED indicator located on the readhead or interface. For example, a bi-coloured LED could be turned green when the alignment is good, red when the channels are no longer aligned and amber (i.e. by emitting both red and green light) when the alignment quality is reduced. In apparatus of the type shown in FIG. 1, the LED 27 may be flashed the appropriate colour when the readhead passes over the reference mark thereby indicating whether the reference mark channel is deemed to be aligned with the incremental channel.

Figure 6:
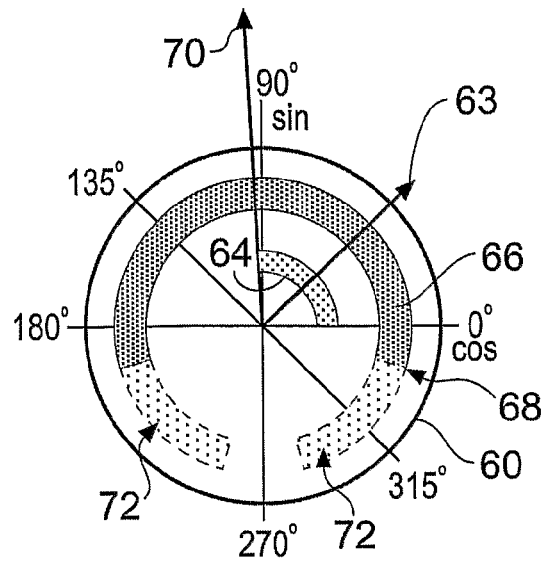
FIG. 6 is a Lissajous diagram illustrating degraded alignment between the reference mark and incremental channels.

Referring to FIG. 6, a further Lissajous diagram is shown that illustrates the phase relationship between the incremental channel and the reference mark channel for apparatus that has become misaligned. The reference mark gating pulse (shown by the superimposed band 66) has a width of around 200° and is centred near 90°. The first edge 68 of the band 66 (i.e. the leading edge of the reference mark gating pulse) is located at around 350° and can be seen to be close to the second superimposed band 64 which represents the associated reference mark pulse.

In this example, the reference mark gating pulse is not well aligned with respect to the associated reference mark pulse (as illustrated by the second superimposed band 64). There is thus a greatly increased possibility of the apparatus failing to correctly identify the desired reference mark pulse. Furthermore, only a small additional reduction in the alignment of the incremental and reference mark channels could cause the first edge 68 of the reference mark gating pulse to encroach into the 0° to 90° region of the reference mark pulse thereby causing malfunction.

The prior art midpoint monitoring technique would determine a reference mark pulse midpoint of 45° (as indicated by arrow 63) and a reference mark gating pulse midpoint of slightly more than 90° (as indicated by arrow 70). Following such an analysis, the prior art technique would (correctly) indicate misalignment has occurred that could cause the apparatus to malfunction.

Although the prior art midpoint detection technique correctly determines the alignment/misalignment of the examples described above it has been found that the technique fails to identify misalignment or, less critically, falsely indicates the existence of misalignment in a number of important cases. For example, if the width of the reference mark gating pulse shown in FIG. 6 had actually increased so that the pulse extended from 280° to 260° as shown by the hatched region 72, the midpoint would still be slightly more than 90° and would thus (falsely) trigger a misalignment warning even though the apparatus would still be operating properly. In other words, it has been appreciated by the inventors that there can be a significant (e.g. 45°) variation in the midpoint of the reference mark gating pulse but this does not necessarily lead to malfunction. Conversely, the midpoint of the reference mark gating pulse may vary only slightly therefore satisfying the prior art phase midpoint alignment criterion despite the width of the reference mark gating pulse being reduced sufficiently (e.g. to less than 90°) to cause misalignment of the reference mark and incremental channels.

An improved misalignment detection method will now be described that involves monitoring the phase of the edges, rather than the midpoint, of the reference mark gating pulse. This has been found to provide a more robust and reliable scheme for assessing whether misalignment between the incremental and reference mark channels has occurred that is likely to cause a malfunction.

Figure 7:
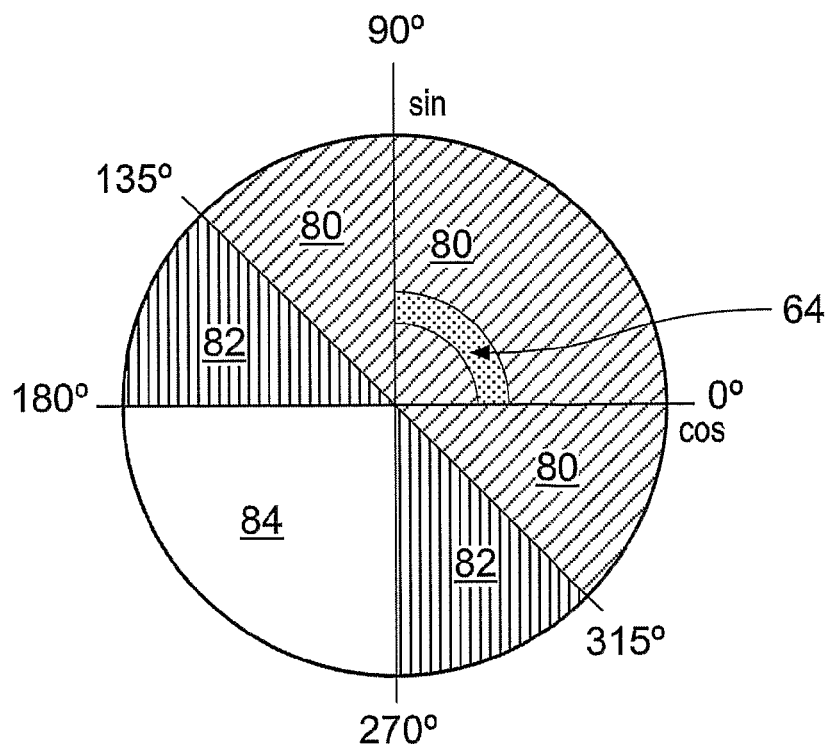
FIG. 7 illustrates the division of the Lissajous diagram into zones.

The improved method involves measuring the phase of both edges of the reference mark gating pulse and determining whether such edges fall within "red", "orange" or "green" phase ranges. FIG. 7 illustrates the technique using a Lissajous diagram that is divided into a red zone 80, orange zones 82 and a green zone 84. In this example, the reference mark pulses are 90° wide and centred on 45° as shown by the superimposed band 64. The angular ranges of the various zones shown in FIG. 7 are outlined in table 1.

TABLE 1

Zone categories

| Angle | Zone Colour |
|---|---|
| −45° to 135° | Red |
| 135° to 180° | orange |
| 180° to 270° | Green |
| 270° to 315° (−45°) | Orange |

It is important to remember that the zones described with reference to FIG. 7 are illustrative examples only. The skilled person would appreciate that the number of zones and/or the angular ranges encompassed by such zones may be selected as required and will depend on the properties of the reference mark pulses and the particular apparatus. The reference mark pulses may also be centred on an angle other than 45°, thereby shifting the various angular ranges of the zones accordingly. Having determined which colour zones the edges of the reference mark gating pulse fall within, the results are combined, as shown in table 2 below, to determine an overall alignment condition which determines the colour of the LED colour flash. The colour of the worst-case edge is used for the LED flash.

TABLE 2

Alignment check outcome logic table

| rising edge colour zone | falling edge colour zone | resultant LED colour flash | Alignment condition |
|---|---|---|---|
| green | green | green | Well aligned |
| green | orange | orange | Poor alignment - readjust soon |
| orange | green | orange | Poor alignment - readjust soon |
| orange | orange | orange | Poor alignment - readjust soon |
| red | green | red | Bad alignment - readjust immediately |
| green | red | red | Bad alignment - readjust immediately |
| orange | red | red | Bad alignment - readjust immediately |
| red | orange | red | Bad alignment - readjust immediately |
| red | red | red | Bad alignment - readjust immediately |

Referring now to FIGS. 8 to 11, four examples of operation of the above method will be given.

Figure 8:
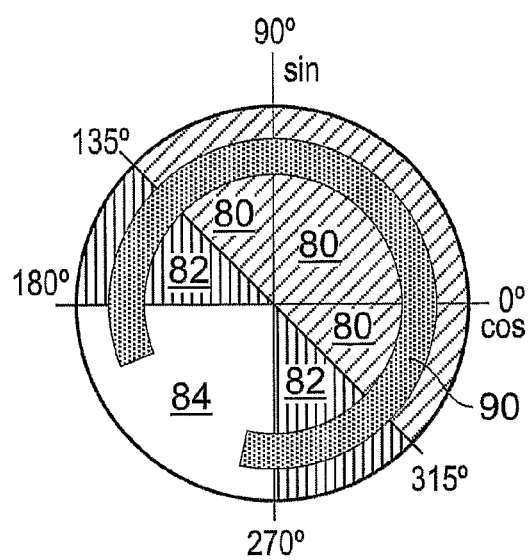
FIG. 8 shows the Lissajous diagram of FIG. 7 having the reference mark gating pulse for a well aligned device superimposed thereon.

FIG. 8 shows a reference mark gating pulse (i.e. band 90) having leading and trailing edges that both fall within the "green" zone 84. The reference mark and incremental channels are thus well aligned (i.e. the reference mark gating pulse brackets the corresponding reference mark pulse) and the readhead indicator LED is flashed green.

Figure 9:
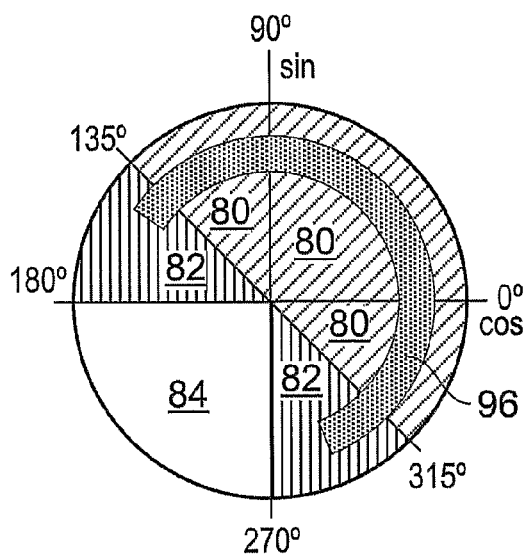
FIG. 9 shows the Lissajous diagram of FIG. 7 having a reference mark gating pulse for a poorly aligned device superimposed thereon.

FIG. 9 shows a reference mark gating pulse (i.e. band 96) having leading and trailing edges that both fall within an "orange" zone 82. The reference mark and incremental channels have thus become somewhat misaligned (i.e. the edges of the reference mark gating pulse are approaching the edges of the corresponding reference mark pulse) and hence a warning that some misalignment has occurred is provided by flashing the indicator LED orange.

Figure 10:
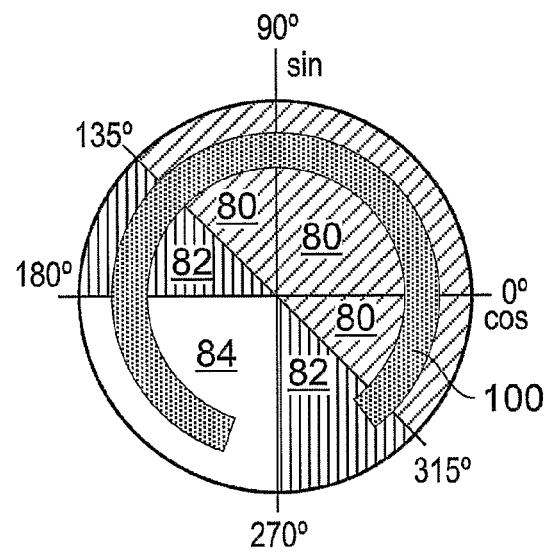
FIG. 10 shows the Lissajous diagram of FIG. 7 having a reference mark gating pulse for a poorly aligned device superimposed thereon.

FIG. 10 shows a reference mark gating pulse (i.e. band 100) having a leading edge that falls within the "orange" zone 82 and a trailing edge that falls with the green zone 84. The reference mark and incremental channels have thus become somewhat misaligned (i.e. the edges of the reference mark gating pulse are approaching the edges of the corresponding reference mark pulse) triggering a warning that some misalignment has occurred by flashing the indicator LED orange.

Figure 11:
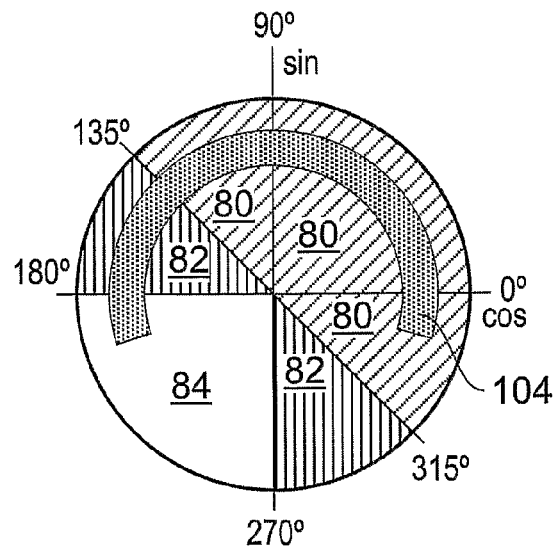
FIG. 11 shows the Lissajous diagram of FIG. 7 having a reference mark gating pulse for a misaligned device superimposed thereon.

FIG. 11 shows a reference mark gating pulse (i.e. superimposed band 104) having a leading edge that falls within the red zone 82 and a trailing edge that falls with the green zone 84. The reference mark and incremental channels are misaligned to such an extent that a malfunction is likely to occur. A warning that the apparatus is misaligned and needs immediate recalibration is provided by flashing the indicator LED red. It should be noted that the prior art mid-point detection technique described above would have given an erroneous "green" flash in this instance because the mid-point of the reference mark gating pulse lies within the 0° to 90° range.

Referring to FIG. 12, a further example of a device operating using the method of the present invention is shown. FIGS. 12a-12i show a Lissajous diagram comprising a green zone 100 that extends from 135° to 315°; an orange zone 102 that extends from 90° and 135° and from 315° to 0°; and a red zone 104 that extends from 0° to 90°.

Figure 12A:
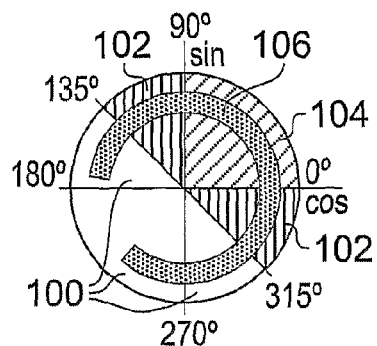
FIGS. 12a-12i show a series of Lissajous diagrams for a further device of the present invention.

In FIG. 12a, a reference mark gating pulse 106 has leading and trailing edges that fall within the green zone. The indicator LED is thus flashed green to indicate good alignment.

Figure 12B:
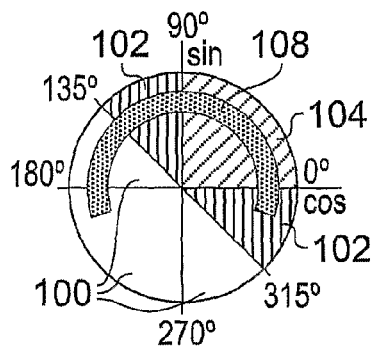
Figure 12C:
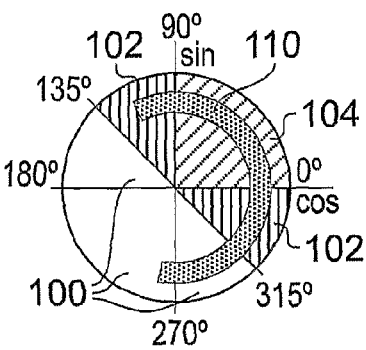
Figure 12D:
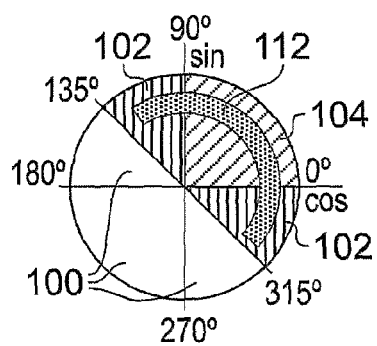
Figure 12E:
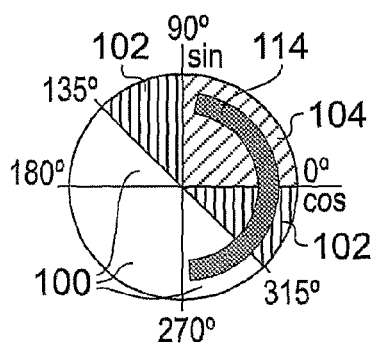
Figure 12F:
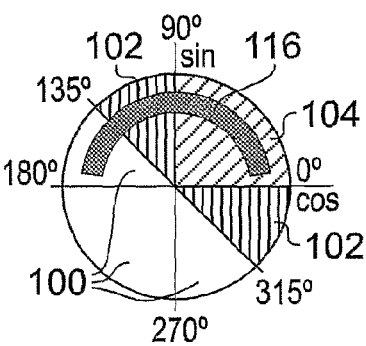
Figure 12G:
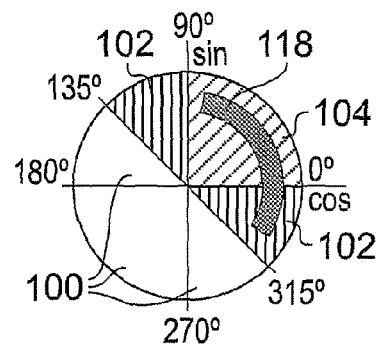
Figure 12H:
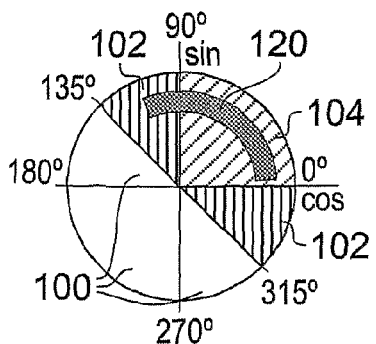
Figure 12I:
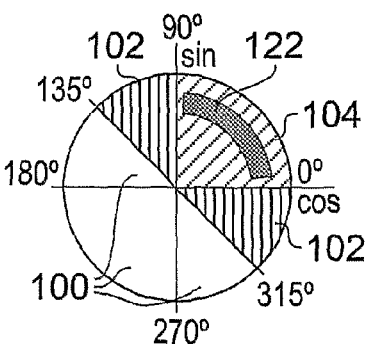

FIGS. 12b and 12c show reference mark gating pulses 108 and 110 that have one edge falling within an orange zone whilst FIG. 12d shows a reference mark gating pulse 112 having both edges falling within the orange zone. In these examples, the LED is flashed orange to indicate that alignment has degraded and that realignment of the reference mark and incremental channels will be required in the near future.

FIGS. 12*e*-12*i* show reference mark gating pulses 114, 116, 118, 120 and 122 having at least one edge in the red zone. In these examples, the LED is flashed red to indicate that alignment has been lost and that malfunction is likely to occur.

Although the apparatus described in the above examples is optical, the skilled person would realise that the scale and readhead system could be implemented in a variety of ways. For example, the technique is equally applicable to magnetic, inductive and capacitance based scale and readhead devices.

The scale and readhead apparatus described herein may also be used to measure translation and/or rotation on a variety of devices. For example, the apparatus could be applied to apparatus used to measure linear translation or to rotary encoder devices. The method described herein is also applicable to two dimensional encoder systems of the type described in EP1099936 and EP 1106972.

The invention claimed is:

1. A scale reading apparatus comprising:
   a readhead moveable relative to a scale, the readhead comprising an incremental channel from which a series of reference mark pulses are produced as the readhead is moved relative to the scale;
   a reference mark channel arranged to produce a reference mark gating pulse when the readhead passes a predetermined (absolute) position mark on the scale; and
   alignment detection means for monitoring, during use, phase alignment of the reference mark gating pulse and reference mark pulses, wherein
   the alignment detection means is arranged to monitor the phase of a leading edge and a trailing edge of the reference mark gating pulse relative to a phase of the reference mark pulses.

2. The scale reading apparatus according to claim 1 wherein the alignment detection means is arranged to generate a first alignment warning signal if one, or both, of the leading and trailing edges fall within a first phase range.

3. The scale reading apparatus according to claim 2 wherein the alignment detection means is arranged to generate a second alignment warning signal if one, or both, of the leading and trailing edges fall outside the first phase range but within a second phase range, the second phase range being wider than said the first phase range.

4. The scale reading apparatus according to claim 3 wherein the alignment detection means is arranged to generate a channel aligned signal if both edges of the reference mark pulse fall outside the second phase range.

5. The scale reading apparatus according to claim 3 wherein the alignment detection means is arranged to generate at least one additional alignment warning signal if one, or both, of the leading and trailing edges fall outside the second phase range but within at least one additional phase range, wherein the at least one additional phase range is wider than the second phase range.

6. The scale reading apparatus according to claim 5 wherein the alignment detection means is arranged to generate a channel aligned signal if both edges of the reference mark pulse fall outside the at least one additional phase range.

7. The scale reading apparatus according to claim 1 wherein the readhead is arranged to generate an output reference mark signal by using the reference mark gating pulse to gate the reference mark pulses.

8. The scale reading apparatus according to claim 1 wherein the incremental channel is additionally arranged to output a series of incremental channel pulses.

9. The scale reading apparatus according to claim 1 wherein the alignment detection means comprises a visual indicator.

10. The scale reading apparatus according to claim 7 wherein the visual indicator comprises a bi-colored light emitting diode (LED).

11. The scale reading apparatus according to claim 1 wherein the alignment detection means comprises suitably configured logic.

12. A scale reading apparatus comprising:
    a readhead moveable relative to a scale;
    an incremental channel from which a series of reference mark pulses are produced as the readhead is moved relative to the scale;
    a reference mark channel arranged to generate a reference mark gating pulse when the readhead passes a predetermined (absolute) position mark on the scale; and
    alignment detection means for monitoring, during use, alignment of the reference mark gating pulse and reference mark pulses, wherein
    the alignment detection means is arranged to monitor whether the reference mark gating pulse brackets a single reference mark pulse.

13. A method for determining alignment of an incremental channel and a reference mark channel in a scale reading apparatus, the method comprising:
    (i) producing a series of reference mark pulses from the incremental channel as a readhead is moved relative to the scale,
    (ii) producing a reference mark gating pulse from the reference mark channel when the readhead passes a predetermined (absolute) position mark on the scale, and
    (iii) monitoring a phase of a leading edge and a trailing edge of the reference mark gating pulse produced by the reference mark channel relative to a phase of the reference mark pulses produced from the incremental channel.

* * * * *